United States Patent
Kennedy, III et al.

(10) Patent No.: US 6,435,983 B2
(45) Date of Patent: *Aug. 20, 2002

(54) ULTIMATE CONTROL, REDUCED SLIPPAGE GOLF BALL

(75) Inventors: Thomas J. Kennedy, III, Wilbraham; John L. Nealon, Springfield; Mark L. Binette, Ludlow, all of MA (US); Michael J. Sullivan, Barrington, RI (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 09/725,610

(22) Filed: Nov. 29, 2000

Related U.S. Application Data

(63) Continuation-in-part of application No. 09/523,561, filed on Mar. 10, 2000, which is a continuation-in-part of application No. 08/920,070, filed on Aug. 26, 1997, now Pat. No. 6,224,498, which is a continuation of application No. 08/542,793, filed on Oct. 13, 1995, now abandoned, which is a continuation-in-part of application No. 08/070,510, filed on Jun. 1, 1993, now abandoned, application No. 09/725,610, which is a continuation-in-part of application No. 09/248,016, filed on Feb. 10, 1999, and a continuation-in-part of application No. 09/226,727, filed on Jan. 7, 1999, and a continuation-in-part of application No. 09/226,340, filed on Jan. 6, 1999.

(60) Provisional application No. 60/226,251, filed on Aug. 17, 2000.

(51) Int. Cl.⁷ .......................... A63B 37/04; A63B 37/06
(52) U.S. Cl. ........................................ 473/371; 473/376
(58) Field of Search ................................ 473/351, 354, 473/355, 356, 358, 359, 361, 363, 364, 365, 367, 368, 370, 371, 372, 373, 374, 375, 376, 377, 378

(56) References Cited

U.S. PATENT DOCUMENTS

| | | | |
|---|---|---|---|
| 4,848,770 A | 7/1989 | Shama | |
| 5,184,828 A | 2/1993 | Kim et al. | |
| 5,490,674 A | 2/1996 | Hamada et al. | |
| 5,674,137 A | 10/1997 | Maruko et al. | |

(List continued on next page.)

FOREIGN PATENT DOCUMENTS

EP 633 043 1/1995

*Primary Examiner*—Paul T. Sewell
*Assistant Examiner*—Alvin A. Hunter, Jr.

(57) ABSTRACT

The present invention is directed to an improved multi-layer golf ball comprising a core, an inner cover layer and an outer cover layer. The inner cover layer is comprised of a relatively hard cover material. The outer cover layer is comprised of a soft, very low modulus ionomer or ionomer blend, or a non-ionomeric thermoplastic elastomer such as polyurethane, polyester or polyesteramide. The outer cover layer exhibits a Shore D hardness of less than 50D. The golf ball may further comprise an optional mantle layer, which may include one or more filler materials. Filler material may be incorporated in one or more of the core, inner cover layer, or outer cover layer. The resulting multi-layered golf ball of the present invention exhibits reduced slippage between the ball and club face, and therefore, relatively high spin rates.

45 Claims, 2 Drawing Sheets

U.S. PATENT DOCUMENTS

| | | |
|---|---|---|
| 5,688,191 A | 11/1997 | Cavallaro et al. |
| 5,704,853 A | 1/1998 | Maruko et al. |
| 5,752,888 A | 5/1998 | Maruko et al. |
| 5,759,676 A * | 6/1998 | Cavallaro et al. ........... 428/215 |
| 5,779,562 A | 7/1998 | Melvin et al. |
| 5,782,707 A | 7/1998 | Yamagishi et al. |
| 5,792,009 A | 8/1998 | Maruko |
| 5,797,808 A | 8/1998 | Hayashi et al. |
| 5,803,831 A | 9/1998 | Sullivan et al. |
| 5,816,937 A | 10/1998 | Shimosaka et al. |
| 5,816,940 A | 10/1998 | Hayashi et al. |
| 5,885,172 A | 3/1999 | Hebert et al. |
| 5,899,822 A | 5/1999 | Yamagishi et al. |
| 5,952,415 A | 9/1999 | Hwang |
| 5,971,871 A | 10/1999 | Sullivan et al. |
| 5,976,035 A | 11/1999 | Umezawa et al. |
| 5,984,806 A | 11/1999 | Sullivan et al. |
| 6,037,419 A | 3/2000 | Takesue et al. |
| 6,045,460 A | 4/2000 | Hayashi et al. |
| 6,123,630 A | 9/2000 | Hayashi et al. |
| 6,129,640 A | 10/2000 | Higuchi et al. |
| 6,277,034 B1 * | 8/2001 | Nesbitt et al. ............... 473/359 |
| 6,287,217 B1 * | 9/2001 | Sullivan et al. ............. 473/374 |
| 6,299,550 B1 * | 10/2001 | Molitor et al. ............... 473/354 |
| 6,325,731 B1 * | 12/2001 | Kennedy et al. ............ 473/377 |

* cited by examiner

ULTIMATE CONTROL, REDUCED SLIPPAGE GOLF BALL

CROSS REFERENCES TO RELATED APPLICATIONS

This application is a continuation-in-part application of U.S. application Ser. No. 09/523,561 filed on Mar. 10, 2000 which is a continuation-in-part application of U.S. application Ser. No. 08/920,070 now U.S. Pat. No. 6,224,498 filed on Aug. 26, 1997 which in turn is a continuation of U.S. application Ser. No. 08/542,793 filed Oct. 13, 1995, now abandoned, which is a continuation-in-part of U.S. application Ser. No. 08/070,510 filed on Jun. 1, 1993, now abandoned. This application is also a continuation-in-part of U.S. application Ser. No. 09/248,016 filed on Feb. 10, 1999; Ser. No. 09/226,340 filed on Jan. 6, 1999; and Ser. No. 09/226,727 filed on Jan. 7, 1999. Additionally, this application claims priority to U.S. Provisional Application No. 60/226,251 filed on Aug. 17, 2000.

FIELD OF THE INVENTION

The present invention relates to golf balls and, more particularly, to improved standard and oversized golf balls comprising multi-layer covers which have a comparatively hard inner layer and a relatively soft outer layer. The golf balls also feature the use of improved core formulations. The improved multi-layer golf balls exhibit reduced slippage between the ball and the club face. The golf balls may also be configured to easily and quickly deform against the club face. Accordingly, the golf balls of the present invention exhibit relatively high spin rates.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, trans-polyisoprene and trans-polybutadiene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the trade name "Iotek", have become the materials of choice for the construction of golf ball covers over the traditional "balata" (trans-polyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the present inventors and others to address these needs. The different types of materials utilized to formulate the cores, covers, etc. of these balls dramatically alter the balls' overall characteristics.

In addition, multi-layered covers containing one or more ionomer resins have also been formulated in an attempt to produce a golf ball having the overall distance, playability and durability characteristics desired. For example, this was addressed by Spalding Sports Worldwide, Inc., the assignee of the present invention, in U.S. Pat. No. 4,431,193 where a multi-layered regular sized, golf ball is disclosed.

In the '193 patent, a multi-layer golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball. Unfortunately, however, while a ball of the '193 patent does exhibit enhanced playability characteristics with improved distance (i.e. enhanced C.O.R. values) over a number of other then known multi-layered balls, the ball suffers from poor cut resistance and relatively short distance (i.e. lower C.O.R. values) when compared to two-piece, single cover layer balls commercially available today. These undesirable properties make the ball produced in accordance with the '193 patent unacceptable by today's standards.

The present invention is directed to a new multi-layer golf ball that readily deforms against a club face under virtually all conditions. Specifically, the present invention golf balls exhibit very little or reduced slippage of the ball on the club face, particularly irons and more particularly short irons, upon impact.

These and other objects and features of the invention will be apparent from the following summary and description of the invention, the drawings and from the claims.

SUMMARY OF THE INVENTION

In a first aspect, the present invention provides a golf ball adapted for reduced slippage upon striking with a golf club. The golf ball comprises a core, an inner cover layer disposed about the core, and an outer cover layer disposed on the inner cover layer. The inner cover layer exhibits a Shore D hardness of from about 40 to about 80. The outer cover layer is very soft and exhibits a Shore D hardness of less than 50. The golf ball exhibits a PGA compression of less than 100.

In another aspect, the present invention provides a multi-layer golf ball comprising a core including polybutadiene having a Mooney viscosity of from about 65 to about 85, an inner cover layer disposed about the core, and an outer cover layer disposed on the inner cover layer. The inner cover layer exhibits a Shore D hardness of from about 50 to about 80. And, the outer cover layer exhibits a Shore D hardness of less than about 50.

In yet another aspect, the present invention provides a multi-layer low slip golf ball comprising a generally spherical core, an inner cover layer disposed about the core, and an outer cover layer disposed about the inner cover layer. The core is recited as including a non-rubber material having a specific gravity of at least 1.5 and polybutadiene. The outer cover layer is relatively soft, having a Shore D hardness of less than 50.

These and other objects and features of the invention will be apparent from the following detailed description.

DETAILED DESCRIPTION OF THE PREFERRED EMBODIMENTS

Figure 1:
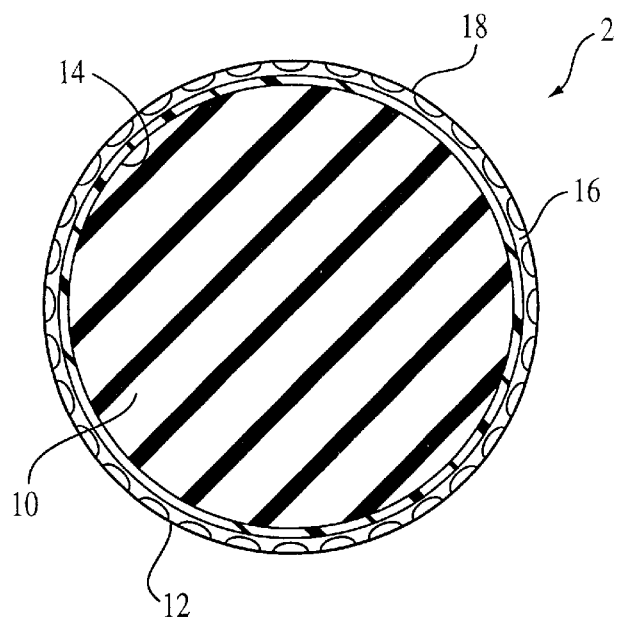
FIG. 1 is a cross-sectional view of a preferred embodiment golf ball 2 according to the present invention illustrating a core 10 and a cover 12 consisting of an inner layer 14 and an outer layer 16 having dimples 18.

The present invention is directed to improved multi-layer golf ball compositions and the resulting multi-layer golf balls produced using the improved compositions. The present invention includes a multi-layer golf ball that easily and quickly deforms against a club face under virtually all conditions, and which exhibits very little or reduced slippage of the ball on the club face. This characteristic of minimal slippage is particularly evident with irons, and more particularly with short irons, at impact. The preferred embodiment golf balls utilize a very soft, e.g., less than about 50D, and/or relatively thick outer cover layers, with or without an unusually soft coating and one or more mantle (or inner) cover layers that range in hardness from about 50 to about 80D. More preferably, the outer layer has a hardness of Shore D 45 or less, and most preferably, less than about 40. More preferably, the hardness of the mantle is greater than 70D. Alternatively a mid-layer of medium hardness is included at a Shore D of about 40 to about 60.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests such as the "nine iron" spin rate test described below in the Examples.

Accordingly, the present invention is directed to an improved multi-layer cover which produces, upon molding each layer around a core (preferably a solid core) to formulate a multi-layer cover, a golf ball exhibiting reducing slippage of the ball on the club face without adversely affecting, and in many instances, improving the ball's playability (hardness/softness) and/or durability (i.e., cut resistance, fatigue resistance, etc.) characteristics.

Figure 2:
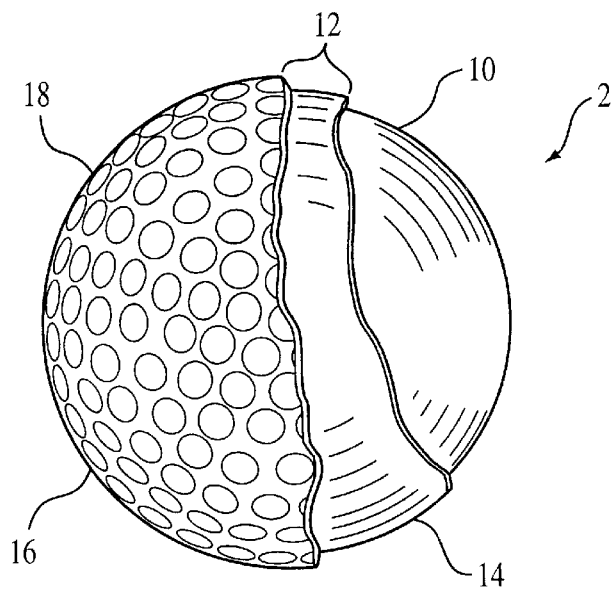
FIG. 2 is another view of the preferred embodiment golf ball illustrated in FIG. 1 having a core 10 and a cover 12 made of an inner layer 14 and an outer layer 16 having dimples 18.

The present invention relates to improved multi-layer golf balls, particularly a golf ball 2 as shown in FIGS. 1 and 2, comprising a multi-layered cover 12 disposed over a solid core 10, and methods for making same.

Figure 3:
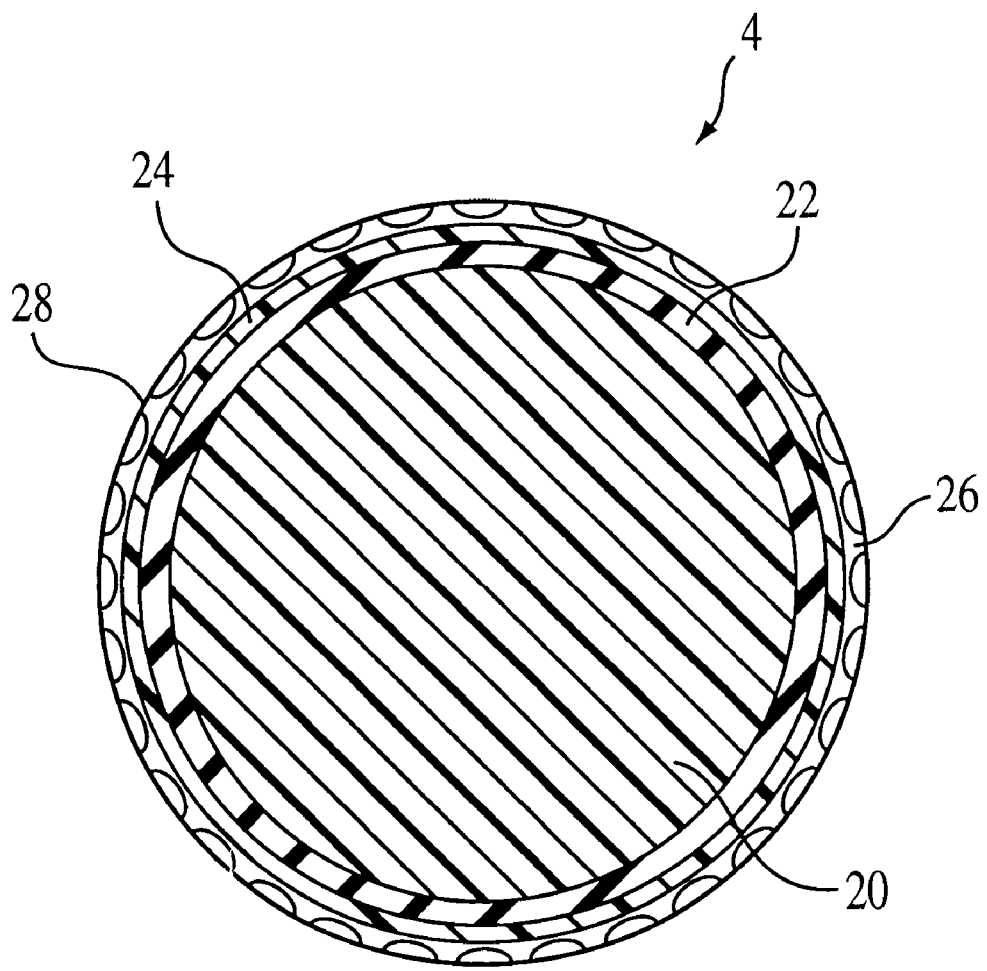
FIG. 3 is a cross-sectional view of another preferred embodiment golf ball 4 in accordance with the present invention illustrating a core 20, a mantle 22, an inner cover layer 24, and an outer cover layer 26 having dimples 28.

The present invention also provides multi-layer golf balls having one or more mantle or interior layers such as golf ball 4 depicted in FIG. 3. The golf ball 4 comprises a core 20, a mantle layer 22, an inner cover assembly 24, and an outer cover assembly 26 having a plurality of dimples 28.

Specifically, in a most preferred aspect of the present invention, a multi-layer cover golf ball having a solid (one or more layers of thermoplastic or thermoset polymer), liquid, hollow or wound core and meeting U.S.G.A. specifications is provided.

The preferred embodiment golf ball has a PGA compression of less than about 100 and preferably is from about 50 to about 90. While a thicker outer cover is thought to be beneficial, the present invention includes golf balls with covers having thicknesses of from about 0.055 inches and thinner.

Other critical parameters, such as specific gravity of various components, exact chemical compositions, wall thicknesses, spin rates, etc. are described in greater detail herein.

Cover Assembly

Referring to the FIGS. 1 and 2 illustrating a preferred embodiment golf ball 2, the multi-layered cover 12 comprises two layers: a first or inner layer or ply 14 and a second or outer layer or ply 16. The inner layer 14 may be comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

The low acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E. I. DuPont de Nemours & Company under the trademark "Surlyn®" and by Exxon Corporation under the trademark "Escor®" or trade name "Iotek", or blends thereof.

The low acid ionomeric resins available from Exxon under the designation "Escor®" and or "Iotek", are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc high acid ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or over-sized golf balls.

For example, the normal size, multi-layer golf ball taught in U.S. Pat. No. 4,650,193 does not incorporate blends of low acid ionomeric resins of the present invention in the inner cover layer. In addition, the multi-layered ball disclosed in the '193 patent suffers substantially in durability in comparison with the present invention.

Furthermore, it has been discovered that use of a inner layer formulated from blends of lower acid ionomers produces multi-layer golf balls having enhanced compression and spin rates. These are the properties desired by the more skilled golfer.

With respect to the outer layer, such as layer 16 shown in FIGS. 1 and 2, of the multi-layered cover of the present invention, the outer cover layer is comparatively softer than the low acid ionomer blend based inner layer. The softness provides for the enhanced feel and playability characteristics typically associated with balata or balata-blend balls.

The outer cover material is comprised of ionomer, polyurethane (cast, reaction injection molded (RIM), thermoplastic polyurethane (TPU)), Pebax®, Hytrel®, metallocene, or any other thermoplastic (or thermosetting) elastomer, or silicone that has a Shore D hardness of less than or equal to about 50D.

More specifically, the outer layer or ply may be comprised of a relatively soft, low modulus (about 1,000 psi to about 10,000 psi) and low acid (less than 16 weight percent acid) ionomer, ionomer blend or a non-ionomeric thermoplastic elastomer such as, but not limited to, a polyurethane, a polyester elastomer such as that marketed by DuPont under the trademark Hytrel®, or a polyester amide such as that marketed by Elf Atochem S.A. under the trademark Pebax®. The outer layer is fairly thin, but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard), low acid, ionomer with a low modulus (soft), low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240. All hardness values described herein, for cover layers having dimples defined therein, are with regard to the land area on the cover, extending between dimples.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the inner and outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 1:

TABLE 1

Typical Properties of Commercially Available Hard Surlyn ® Resins Suitable for Use in the Inner and Outer Layer Blends of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m₂ (ft.-lbs./in²) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present inner and outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the inner and outer layer cover compositions are set forth below in Table 2:

TABLE 2

Typical Properties of Iotek Ionomers

|  | ASTM Method | Units | 4000 | 4010 | 8000 | 8020 | 8030 |
|---|---|---|---|---|---|---|---|
| Resin Properties |  |  |  |  |  |  |  |
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m³ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid |  |  | 16 |  | 11 |  |  |
| % of Acid Groups cation neutralized |  |  | 30 |  | 40 |  |  |
| Plaque Properties (3 mm thick, compression molded) |  |  |  |  |  |  |  |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) |  |  |  |  |  |  |  |
| Tensile at Break MD | D-882 | MPa | 41 | 39 | 42 | 52 | 47.4 |
| TD | D-882 | MPa | 37 | 38 | 38 | 38 | 40.5 |
| Yield point MD | D-882 | MPa | 15 | 17 | 17 | 23 | 21.6 |
| TD | D-882 | MPa | 14 | 15 | 15 | 21 | 20.7 |
| Elongation at Break MD | D-882 | % | 310 | 270 | 260 | 295 | 305 |

TABLE 2-continued

Typical Properties of Iotek Ionomers

| | | | | | | | |
|---|---|---|---|---|---|---|---|
| TD | D-882 | % | 360 | 340 | 280 | 340 | 345 |
| 1% Secant modulus MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Weight Acrylic Acid | | | — | — | — |
| % of Acid Groups Cation Neutralized | | | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the inner and outer cover compositions. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the inner and outer layers of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 3

Physical Properties of Iotek 7520

| Property | ASTM Method | Units | Typical Value |
|---|---|---|---|
| Melt Index | D-1238 | g/10 min. | 2 |
| Density | D-1505 | kg/m$^3$ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |

| Plaque Properties (2 mm thick Compression Molded Plaques) | | | |
|---|---|---|---|
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, it has been found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 4

Physical Properties of Iotek 7510 in Comparison to Iotek 7520

|  | IOTEK 7520 | IOTEK 7510 |
| --- | --- | --- |
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 10 percent soft ionomer resin. However, as previously noted, it is preferred that the outer cover layer have a Shore D hardness of 50 or less, more preferably less than about 45, and most preferably less than about 40.

Specific formulations which may be used in the cover composition are included in the examples set forth in U.S. Pat. Nos. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B. F. Goodrich Company's Estane® polyester polyurethane X4517. According to B. F. Goodrich, Estane® X-4517 has the following properties set forth in Table 5:

TABLE 5

Properties of Estane ® X-4517

| Tensile | 1430 |
| --- | --- |
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity (water equals 1.0) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced spin characteristics produced by the low acid ionomer resin compositions. These include, but are not limited to, thermoplastic polyurethanes such as Texin thermoplastic polyurethanes from Mobay Chemical Co. and the Pellethane thermoplastic polyurethanes from Dow Chemical Co.; ionomer/rubber blends such as those in Spalding U.S. Pat. Nos. 4,986,545; 5,098,105 and 5,187,013; and, Hytrel® polyester elastomers from DuPont and Pebax® polyesteramides from Elf Atochem S.A.

In a two-layer cover version of the present invention golf ball, such as illustrated in FIGS. 1 and 2, the outermost cover layer is preferably thicker than 0.055 inches, and is most preferably from about 0.70 to about 0.100 inches thick. Preferably, the outermost cover layer is made of nearly all Iotek 7510 or similar material disposed over a mantle of high acid ionomer at a thickness of, or less than, about 0.50 inches. The core may be somewhat harder and faster than current cores to achieve good overall distance.

In a three-layer cover version, such as illustrated in FIG. 3, each layer has a thickness of from about 0.020 to about 0.100 inches and preferably from about 0.030 to about 0.070 inches. Preferably, the outer cover exhibits a Shore D hardness of less than 50D, and more preferably less than 47D. Furthermore, the outer cover is mostly, if not all soft ionomer or polyurethane, thermoplastic polyurethane, Pebax®, Hytrel®, or blends thereof. The middle layer is preferably a medium hardness hard/soft ionomer blend or any other material that exhibits a 40 to 60D hardness. Preferably, the innermost layer exhibits a hardness of more than 50D and preferably more than 70D and could be high acid ionomer, or any other material that functions in a suitable fashion.

In preparing golf balls in accordance with the present invention, a hard inner cover layer is molded (by injection molding or by compression molding) about a core (preferably a solid core). A detailed description of other preferred cores is provided herein. A comparatively softer outer layer is then molded over the inner layer.

Preferably, together, the core, the inner cover layer and the outer cover layer combine to form a ball having a diameter of 1.680 inches or more, the minimum diameter permitted by the rules of the United States Golf Association and weighing about 1.620 ounces.

Additional materials may be added to the cover compositions (both inner and outer cover layer) of the present invention including dyes (for example, Ultramarine Blue sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a master batch containing the desired additives in a Banbury® mixer, two-roll mill, or extruder prior to molding. The blended composition is then formed into slabs and maintained in such a state until molding is desired. Alternatively, a simple dry blend of the pelletized or granulated resins and color master batch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the low acid ionomer resin compositions used to produce the inner cover layer.

As previously noted, the preferred golf balls of the present invention utilize improved dimple patterns. These are set forth in detail in the following patents assigned to the same assignee as the present invention, Spalding Sports Worldwide, Inc.: U.S. Pat. Nos. Des. 401,986; Des. 401,979; U.S. Pat. Nos. 5,833,443; 5,772,532; 5,766,098; 5,735,756; 5,688,194; U.S. Pat. Nos. Des. 383,179; Des. 381,723; Des. 381,722; Des. 381,721; Des. 381,720; Des. 377,816; U.S. Pat. No. 5,588,924; U.S. Pat. No. Des. 375,339; U.S. Pat. Nos. 5,569,100; 5,507,493; 5,482,287; 5,482,286; and 5,470,075, all of which are hereby incorporated by reference.

Mantle Assembly and Filler Materials

The preferred embodiment golf ball may also comprise one or more mantle layers disposed between the previously described cover assembly and a core assembly described below. One such preferred configuration is shown in FIG. 3.

The mantle preferably comprises high acid ionomer ($\geq 16\%$) or low acid ionomer ($\geq 15\%$) or a hard/soft blend, but preferably has a Shore D of from about 50 to about 80D and is harder than the outer cover layer. The mantle thickness is generally from about 0.020 inches to about 0.150 inches and preferably from about 0.030 to about 0.060 inches.

Alternatively, the mantle and/or inner layers comprise non-ionomeric materials of Shore D hardness greater than 50 such as polyamide, AMODEL™, polycarbonate, silicone, polyolefinic, polyester, Hytrel®, etc.

As previously noted, FIG. 3 illustrates another preferred embodiment golf ball 4 in accordance with the present invention. That preferred ball 4 comprises a core 20, at least one mantle layer 22 disposed about the core 20, an inner cover layer 24 disposed about the mantle layer 22, and an outer cover layer 26 disposed about the inner cover layer 24. The core 20 and cover layers 24, 26 are as described herein.

More specifically, the mantle layer may be formed from a wide array of materials including ionomers and/or non-ionomeric materials. Examples of non-ionomeric materials which are suitable for use in forming the mantle layer include, but are not limited to, low density polyethylene, linear low density polyethylene, high density polyethylene, polypropylene, rubber-toughened olefin polymers, acid copolymers which do not become part of an ionomeric copolymer when used in the inner cover layer, plastomers, flexomers, and thermoplastic elastomers such as styrene/butadiene/styrene (SBS) or styrene/ethylene-butylene/styrene (SEBS) block copolymers, including Kraton® (Shell), dynamically vulcanized elastomers such as Santoprene® (Monsanto), ethylene vinyl acetates such as Elvax® (DuPont), ethylene methyl acrylates such as Optema® (Exxon), polyvinyl chloride resins, and other elastomeric materials may be used. It is desirable that the polyolefin be a tough, low density material. The non-ionomeric polyolefins can be mixed with ionomers.

The cover, mantle, and/or core may include fillers which include, but are not limited to, clay, talc, asbestos, graphite, glass, mica, calcium metasilicate, barium sulfate, zinc sulfide, aluminum hydroxide, silicates, diatomaceous earth, carbonates such as calcium carbonate, magnesium carbonate and the like, metals such as titanium, tungsten, aluminum, bismuth, nickel, molybdenum, iron, copper, brass, boron, bronze, cobalt and beryllium, and alloys of the above metals, metal oxides such as zinc oxide, iron oxide, aluminum oxide, titanium oxide, magnesium oxide, zirconium oxide and the like, particulate synthetic plastic such as high molecular weight polyethylene, polystyrene, polyethylene ionomer resins and the like, particulate carbonaceous materials such as carbon black, natural bitumen and the like, as well as cotton flock, cellulose flock, and leather fiber. Dark colored fillers generally are not preferred for use at the outer surface of the ball if a white ball is desired. The amount of filler employed is primarily a function of weight restrictions. For example, weight may be removed from the core and placed in the inner and/or outer cover. This added weight will change the moment of inertia of the ball thereby potentially altering performance.

Examples of various suitable heavy filler materials which can be included in the present invention are set forth in Table 6 as follows:

TABLE 6

| Filler Type | Spec. Grav. |
| --- | --- |
| graphite fibers | 1.5–1.8 |
| precipitated hydrated silica | 2.0 |
| clay | 2.62 |
| talc | 2.85 |
| asbestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfide | 4.1 |
| silicates | 2.1 |
| diatomaceous earth | 2.3 |
| calcium carbonate | 2.71 |
| magnesium carbonate | 2.20 |
| Metals and Alloys (powders) | |
| titanium | 4.51 |
| tungsten | 19.35 |
| aluminum | 2.70 |
| bismuth | 9.78 |
| nickel | 8.90 |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zircomium oxide | 5.73 |
| Metal Stearates | |
| zinc stearate | 1.09 |
| calcium stearate | 1.03 |
| barium stearate | 1.23 |
| lithium stearate | 1.01 |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the multi-layered golf ball desired. Generally, lesser amounts of high specific gravity materials are necessary to produce an increase in the moment of inertia in comparison to low specific gravity materials. Furthermore, handling and processing conditions can also affect the type of heavy weight filler material incorporated into cover layers.

The most preferred ball construction uses a bronze filled mantle to increase the Moment of Inertia (M.O.I.). This construction utilizes a 19 parts per hundred (PPH) addition of bronze powder to the mantle. This results in a specific gravity for the mantle of about 1.12. It is possible to increase the amount of bronze or other heavy metal. Another most preferred filler is tungsten powder due to its very high specific gravity. Other heavy fillers may be utilized to reduce the amount of weighting material otherwise added to the core. The preferred minimum core specific gravity is about 1.05.

Using the multi-layer construction described herein, the mantle layer can be loaded with tungsten powder to produce a golf ball weighing about 45.5 grams. A preferred set of specific gravities for a preferred embodiment golf ball is set forth below.

TABLE 7

| | Sp. Gr. |
| --- | --- |
| Core | 1.05 |
| Mantle | 1.63 |
| Cover | 0.96 |

A preferred mantle composition is as follows:

TABLE 8

| | PPH | VOLUME % |
| --- | --- | --- |
| Ionomer | 100.0 | 104 |
| Tungsten | 75.7 | 3.9 |

Using tungsten powder, only 3.9% by volume is required to obtain a mantle specific gravity of 1.63. This greatly increases the M.O.I., reduces spin decay and increases the total distance of the resulting ball due to increased roll.

The calculated M.O.I. for this preferred construction is 0.4640 oz.-inch$^2$. A typical 1.68 inch two-piece golf ball has a M.O.I. of 0.445 oz.-inch$^2$. Tungsten or other heavy metal can also be added to the outer cover to further increase the M.O.I. provided that the overall ball weight does not exceed the U.S.G.A. maximum. Adding the powdered metal to the cover will make it necessary to use a white pigmented paint to cover the dark color of the molded cover.

Core Assembly

The core is solid, liquid, gel, wound, multi-piece solid, and in at least one embodiment, is a solid diene rubber core comprising a very heavy, essentially non-rubber inner core of a heavy material (S.G.≧1.5) such as steel or tungsten.

Alternatively, the core may be a dual-core comprising a stainless steel center. This would enable a golfer to impart very high initial spin rates more readily than current constructions.

Another type of core configuration encompassed by the present invention utilizes a liquid centered wound core. Other examples utilize a solid or gel-centered wound core. Still other examples uses a "unique" hollow or liquid or gel filled sphere of ionomer as a core.

The conventional solid core is about 1.545 inches in diameter, although it can range from about 1.37 to about 1.575 inches. Conventional solid cores are typically compression molded from a slug of uncured or lightly cured elastomer composition comprising a high cis content polybutadiene and a metal salt of an α, β, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The core compositions of the preferred embodiments of the present invention may comprise one or more rubber or elastomeric components and an array of non-rubber or non-elastomeric components. The preferred rubber components of the core compositions of the invention comprise a particular solid polybutadiene having an ultra-high Mooney viscosity and certain molecular weight characteristics described in detail below, and one or more other optional polybutadienes. The non-rubber components of the core compositions of the invention comprise one or more crosslinking agents which preferably include an unsaturated carboxylic acid component, a free radical initiator to promote cross linking, one or more optional modifying agents, fillers such as those previously described with respect to the mantle, moldability additives, processing additives, and dispersing agents, all of which are described in greater detail below.

The preferred polybutadiene resin for use in the present invention composition has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity ($ML_{1+4}$ (100° C.)), is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available, such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\sum W_i}{\sum W_i / M_i}$$

where $W_i$ is the molecular weight of a fraction or sample of the polymer and $M_i$ is the total number of fractions or samples.

"Weight average molecular weight," $M_W$, is defined as:

$$M_w = \frac{\sum W_i M_i}{\sum W_i}$$

where $W_i$ and $M_i$ have the same meanings as noted above.

The "Z-average molecular weight," $M_Z$, is defined as:

$$M_z = \frac{\sum W_i M_i^2}{\sum W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight provides an indication of the distribution or rather the "spread" of molecular weights of the polymer under review.

A common indicator of the degree of molecular weight distribution of a polymer is its "polydispersity,"P:

$$P = \frac{M_w}{M_n}$$

Polydispersity, or "dispersity" as sometimes referred to herein, also provides an indication of the extent to which the polymer chains share the same degree of polymerization. If the polydispersity is 1.0, then all polymer chains must have the same degree of polymerization. Since weight average molecular weight is always equal to or greater than the number average molecular weight, polydispersity, by definition, is equal to or greater than 1.0:

$$P \geq 1.0$$

The particular polybutadiene for use in the preferred embodiment compositions of the present invention (i) exhibits a Mooney viscosity of from about 65 to about 85, and preferably from about 70 to about 83; ii) has a number average molecular weight $M_n$ of from about 90,000 to about 130,000; and preferably from about 100,000 to about 120,000; iii) has a weight average molecular weight $M_w$ of from about 250,000 to about 350,000; and preferably from about 290,000 to about 310,000; iv) has a Z-average molecular weight $M_z$ of about 600,000 to about 750,000; and preferably from about 660,000 to about 700,000; and, v) has a peak molecular weight $M_{peak}$ of about 150,000 to about 200,000; and preferably from about 170,000 to about 180,000.

The term "ultra high Mooney viscosity" used in reference to the preferred polybutadienes, refers to such polybutadienes having Mooney viscosities of from about 65 to about 85.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1, 4 bond, more preferably, having a cis-1, 4 polybutadiene content of about 90%, and most preferably, having a cis-1,4 polybutadiene content of at least about 95%. A preferred polybutadiene, as described herein, is obtained by utilizing a cobalt or cobalt-based catalyst. However, polybutadienes exhibiting the foregoing characteristics, which are obtained by using a lanthanum rare earth catalyst, nickel catalyst, or mixtures thereof, are also encompassed by the present invention. It is also envisioned that other catalysts could be utilized to produce the particular preferred polybutadienes described herein. Examples of such other catalysts include, but are not limited to, aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex® BCP 820, from Shell Chimie of France. The properties and characteristics of this preferred polybutadiene are set forth below in Table 9.

TABLE 9

Properties of Shell Chimie BCP 820 (Also known as BR-1202J)

| Property | Value | |
|---|---|---|
| Mooney Viscosity (approximate) | 73–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.7 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex® BR-1 220 polybutadiene available from Shell Chemical (see Table 10 below); and Taktene™ 220 polybutadiene available from Bayer Corp. of Orange, Tex. (see Tables 11 and 12 below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 10

Properties of Cariflex ® BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex ®) (ML1 + 4 @ 212° F.)
90% Cure - 10.0–13.0
Polydispersity 2.75–3.0

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 11

Properties of Taktene ™ 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. - 35–45 40 Typical
(ML1 + 4' @ 212 Deg. F./212° F.)
Specific Gravity - 0.91
Color - Transparent - almost colorless (15 APHA Max.)
Moisture % - 30% Max. ASTM 1416-76 Hot Mill Method

TABLE 12

Properties of Taktene ™ 220 Polybutadiene

| Product Description | A low Mooney viscosity, non-staining, solution polymerized, high cis-1,4-polybutadiene rubber. | | |
|---|---|---|---|
| Raw Polymer Properties | Property | Range | Test Method |
| | Mooney viscosity 1 + 4(212° F.) | 40 ± 5 | ASTM D 1646 |
| | Volatile matter (wt %) | 0.3 max. | ASTM D 1416 |
| | Total Ash (wt %) | 0.25 max. | ASTM D 1416 |
| | Polydispersity | [need data] | |
| Cure$^{(1)(2)}$ Characteristics | Minimum torque | | |
| | $M_L$ (dN.m) | 9.7 ± 2.2 | ASTM D 2084 |
| | (lbf).in) | 8.6 ± 1.9 | ASTM D 2084 |
| | Maximum torque | | |
| | $M_H$ (dN.m) | 35.7 ± 4.8 | ASTM D 2084 |
| | (lbf.in) | 31.6 ± 4.2 | ASTM D 2084 |
| | $t_2 1$ (min) | 4 ± 1.1 | ASTM D 2084 |
| | t'50 (min) | 9.6 ± 2.5 | ASTM D 2084 |
| | t'90 (min) | 12.9 ± 3.1 | ASTM D 2084 |
| Other Product Features | Property | Typical Value | |
| | Specific gravity | 0.91 | |
| | Stabilizer type | Non-staining | |

[1]Monsanto Rheometer at 160° C., 1.7 Hz (100 cpm), 1 degree arc, micro-die

TABLE 12-continued

Properties of Taktene ™ 220 Polybutadiene (2)Cure characteristics determined on ASTM D 3189 MIM mixed compound:

| | |
|---|---|
| TAKTENE ™ 220 | 100 (parts by mass) |
| Zinc oxide | 3 |
| Stearic acid | 2 |
| IRB #6 black (N330) | 60 |
| Naphthenic oil | 15 |
| TBBS | 0.9 |
| Sulfur | 1.5 |

*This specification refers to product manufactured by Bayer Corp., Orange, Texas, U.S.A.

The preferred embodiment core compositions of the present invention generally comprise from about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significantly greater proportion than the rubber portion. The rubber components include the previously described ultra-high Mooney viscosity polybutadiene. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (buylperoxy) valerate, 1,1-bis(t-butylperoxy) -3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco® 230 or 231 XL, a peroxyketal manufactured and sold by Atochem, Lucidol Division, Buffalo, N.Y., and Trigonox® 17/40 or 29/40, a1, 1-di-(t-butylperoxy)-3,3,5-trimethyl cyclohexane sold by Akzo Chemie America, Chicago, Ill. The one hour half life of Luperco® 231 XL is about 112° C., and the one hour half life of Trigonox® 29/40 is about 129° C.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, silica, mica barytes, calcium carbonate, or clays. Limestone is ground calcium/magnesium carbonate and is used because it is an inexpensive, heavy filler. Other heavy weight fillers include metal particles, such as powdered tungsten. A wide array of suitable fillers are noted herein with regard to the mantle.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions. When utilized, the diioscyanates are included in amounts of from about 0.2 to about 5.0 parts by weight based on 100 parts rubber. Exemplary of suitable diisocyanates is 4,4"-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high die swell characteristics.

Examples of such second polybutadienes obtained by using a neodymium-based catalyst include NEOCIS™ 40, NEOCIS™ 60 from Enichem and CB-22, CB-23, and CB-24 from Bayer. The properties of these polybutadienes are given below.

TABLE 13

Properties of NEOCIS ™

| Properties of Raw Polymer | |
|---|---|
| Microstructure | |
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) | |
| Vulcanization at 145° C. | |
| Tensile strength, 35' cure, | 16 MPa |
| Elongation, 35' cure, | 440% |
| 300% modulus, 35' cure, | 9.5 MPa |

TABLE 14

Properties of CB-22

| TESTS | RESULTS | SPECIFICATIONS |
|---|---|---|
| 1. Mooney-Viscosity ML 1 + 4 100 Cel/ASTM-sheet | | |
| ML 1 + 1 Minimum | 58 | MIN.58 ME |
| Maximum | 63 | MAX.68 ME |
| Median | 60 | 58–68 ME |
| 2. Content of ash DIN 53568 Ash | 0.1 | MAX.0.5% |
| 3. Volatile matter heating 3h/105 Cel Loss in weight | 0.11 | MAX.0.5% |
| 4. Organic acid Bayer Nr.18 Acid | 0.33 | MAX.1.0% |
| 5. CIS-1,4 content IR-spectroscopy CIS 1,4 | 97.62 | MIN.96.0% |
| 6. Vulcanization behavior Monsanto MDR/160 Cel DIN 53529 Compound after | | |
| ts01 | 3.2 | 2.5–4.1 min |
| t50 | 8.3 | 6.4–9.6 min |
| t90 | 13.2 | 9.2–14.0 min |
| s'min | 4.2 | 3.4–4.4 dN · m |
| s'max | 21.5 | 17.5–21.5 dN · m |
| 7. Informative data Vulcanization 150 Cel 30 min | | |
| Tensile | ca. 15.0 | |
| Elongation at break | ca. 450 | |
| Stress at 300% elongation | ca. 9.5 | |

TABLE 15

Properties of CB-23

| TESTS | RESULTS | SPECIFICATIONS |
|---|---|---|
| 1. Mooney-Viscosity ML 1 + 4 100 Cel/ASTM-sheet | | |
| ML 1 + 4 Minimum | 50 | MIN.46 ME |
| Maximum | 54 | MAX.56 ME |
| Median | 51 | 46–56 ME |
| 2. Content of ash DIN 53568 Ash | 0.09 | MAX.0.5% |
| 3. Volatile matter DIN 53526 Loss in weight | 0.19 | MAX.0.5% |
| 4. Organic acid Bayer Nr.18 Acid | 0.33 | MAX.1.0% |
| 5. CIS-1,4 content IR-spectroscopy CIS 1,4 | 97.09 | MIN.96.0% |
| 6. Vulcanization behaviour Monsanto MDR/160 Cel DIN 53529 | | |
| Compound after | MIN.96.0 | |
| ts01 | 3.4 | 2.4–4.0 min |
| t50 | 8.7 | 5.8–9.0 min |
| t90 | 13.5 | 8.7–13.5 min |
| s'min | 3.1 | 2.7–3.8 dN · m |
| s'max | 20.9 | 17.7–21.7 dN · m |

TABLE 15-continued

Properties of CB-23

| TESTS | RESULTS | SPECIFICATIONS |
|---|---|---|
| 7. Vulcanization test with ring Informative data | | |
| Tensile | ca. 15.5 | |
| Elongation at break | ca. 470 | |
| Stress at 300% elongation | ca. 9.3 | |

TABLE 16

Properties of CB-24

| TESTS | RESULTS | SPECIFICATIONS |
|---|---|---|
| 1. Mooney-Viscosity ML 1 + 4 100 Cel/ASTM-sheet | | |
| ML 1 + 4 Minimum | 44 | MIN.39 ME |
| Maximum | 46 | MAX.49 ME |
| Median | 45 | 39–49 ME |
| 2. Content of ash DIN 53568 Ash | 0.12 | MAX.0.5% |
| 3. Volatile matter DIN 53526 Loss in weight | 0.1 | MAX.0.5% |
| 4. Organic acid Bayer Nr.18 Acid | 0.29 | MAX.1.0% |
| 5. CIS-1,4 content IR-spectroscopy CIS 1,4 | 96.73 | MIN.96.0% |
| 6. Vulcanization behaviour Monsanto MDR/160 Cel DIN 53529 Compound after masticator | | |
| ts01 | 3.4 | 2.6–4.2 min |
| t50 | 8.0 | 6.2–9.4 min |
| t90 | 12.5 | 9.6–14.4 min |
| s'min | 2.8 | 2.0–3.0 dN · m |
| s'max | 19.2 | 16.3–20.3 dN · m |
| 7. Informative data Vulcanization 150 Cel 30 min | | |
| Tesile | ca 15.0 | |
| Elongation at break | ca. 470 | |
| Stress at 300% elongation | ca. 9.1 | |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

These preferred embodiment golf ball cores can be formed by the techniques described in U.S. application Ser. No. 09/248,016, filed Feb. 10, 1999, herein incorporated by reference.

The golf balls of the present invention can be produced by molding processes currently well known in the golf ball art. Specifically, the golf balls can be produced by injection molding or compression molding the inner cover layer about wound or solid molded cores to produce an intermediate golf ball having a diameter of about 1.50 to 1.67 inches, and preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the low acid ionomer resin inner layer and the relatively softer, low flexural modulus outer layer provide for an improved multi-layer golf ball which provides for desirable coefficient of restitution, compression, spin and durability properties while at the same time offering the feel characteristics associated with soft balata and balata-like covers of the prior art.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A multi-layer golf ball adapted for reduced slippage upon a golf club face, said multi-layer golf ball comprising:
   a spherical core;
   an inner cover layer disposed about said core, said inner cover layer exhibiting a Shore D hardness of from about 40 to about 80; and
   an outer cover layer defining a plurality of dimples along an outer surface of said outer cover layer, said outer cover layer disposed on said inner cover layer, said outer cover layer exhibiting a Shore D hardness of less than 50, said multi-layer golf ball exhibiting a PGA compression less than 100.

2. The multi-layer golf ball of claim 1 wherein said outer cover exhibits a Shore D hardness of less than 45.

3. The multi-layer golf ball of claim 2 wherein said outer cover exhibits a Shore D hardness of less than 40.

4. The multi-layer golf ball of claim 1 wherein said inner cover layer exhibits a Shore D hardness of from about 50 to about 80.

5. The multi-layer golf ball of claim 1 wherein said inner cover layer exhibits a Shore D hardness of from 70 to 80.

6. The multi-layer golf ball of claim 1 wherein said outer cover layer has a thickness in the range of from about 0.07 to about 0.1 inches.

7. The multi-layer golf ball of claim 1 wherein said outer cover layer has a thickness greater than 0.055 inches.

8. The multi-layer golf ball of claim 1 wherein said golf ball exhibits a PGA compression of from about 50 to about 90.

9. The multi-layer golf ball of claim 8 wherein said golf ball exhibits a PGA compression of from about 60 to about 80.

10. The multi-layer golf ball of claim 1 further comprising:
   a mantle layer disposed between said core and said inner cover layer.

11. The multi-layer golf ball of claim 10 wherein said mantle layer has a thickness in the range of from about 0.020 to about 0.150 inches.

12. The multi-layer golf ball of claim 11 wherein said mantle layer has a thickness in the range of from about 0.030 to about 0.060 inches.

13. The multi-layer golf ball of claim 10 wherein each of said inner cover layer, said outer layer, and said mantle layer has a thickness in the range of from about 0.02 to about 0.1 inches.

14. The multi-layer golf ball of claim 13 wherein each of said inner cover layer, said outer cover layer, and said mantle layer has a thickness in the range of from about 0.03 to about 0.07 inches.

15. The multi-layer golf ball of claim 13 wherein said outer cover layer exhibits a Shore D hardness of less than 47.

16. The multi-layer golf ball of claim 10 wherein said mantle layer comprises a particulate filler material dispersed throughout said mantle layer.

17. The multi-layer golf ball of claim 1 wherein said core is a core selected from the group consisting of a solid core, a liquid core, a gel core, a wound core, and a multi-piece solid core.

18. The multi-layer golf ball of claim 1 wherein said core comprises a metallic core component centrally disposed within said core.

19. The multi-layer golf ball of claim 18 wherein said metallic core component comprises a metal selected from the group consisting of steel, bismuth, tungsten, and stainless steel.

20. A low slip multi-layer golf ball comprising:
   a core including a polybutadiene having a Mooney viscosity of from about 65 to about 85;
   an inner cover layer disposed about said core, said inner cover layer exhibiting a Shore D hardness of from about 50 to about 80; and
   an outer cover layer disposed on said inner cover layer and exhibiting a Shore D hardness of less than about 50.

21. The multi-layer golf ball of claim 20 wherein said outer cover exhibits a Shore D hardness of less than 45.

22. The multi-layer golf ball of claim 21 wherein said outer cover exhibits a Shore D hardness of less than 40.

23. The multi-layer golf ball of claim 20 wherein said inner cover layer exhibits a Shore D hardness of at least 70.

24. The multi-layer golf ball of claim 20 wherein said outer cover layer has a thickness in the range of from about 0.07 to about 0.1 inches.

25. The multi-layer golf ball of claim 20 wherein said outer cover layer has a thickness greater than 0.055 inches.

26. The multi-layer golf ball of claim 20 wherein said golf ball exhibits a PGA compression less than 100.

27. The multi-layer golf ball of claim 26 wherein said golf ball exhibits a PGA compression of from about 50 to about 90.

28. The multi-layer golf ball of claim 20 further comprising:
   a mantle layer disposed between said core and said inner cover layer.

29. The multi-layer golf ball of claim 28 wherein said mantle layer has a thickness in the range of from about 0.020 to about 0.150 inches.

30. The multi-layer golf ball of claim 29 wherein said mantle layer has a thickness in the range of from about 0.030 to about 0.060 inches.

31. A multi-layer low slip golf ball adapted for improved control, said golf ball comprising:
   a generally spherical core including (i) a non-rubber material having a specific gravity of at least 1.5 and (ii) polybutadiene;
   an inner cover layer disposed about said core; and
   an outer cover layer disposed about said inner cover layer, said outer cover layer having a Shore D hardness of less than 50.

32. The multi-layer golf ball of claim 31 wherein said outer cover exhibits a Shore D hardness of less than 45.

33. The multi-layer golf ball of claim 32 wherein said outer cover exhibits a Shore D hardness of less than 40.

34. The multi-layer golf ball of claim 31 wherein said inner cover layer exhibits a Shore D hardness of from about 50 to about 80.

35. The multi-layer golf ball of claim 31 wherein said inner cover layer exhibits a Shore D hardness of at least 70.

36. The multi-layer golf ball of claim 31 wherein said outer cover layer has a thickness in the range of from about 0.07 to about 0.1 inches.

37. The multi-layer golf ball of claim 31 wherein said outer cover layer has a thickness greater than 0.055 inches.

38. The multi-layer golf ball of claim 31 further comprising:
   a mantle layer disposed between said core and said inner cover layer.

39. The multi-layer golf ball of claim 38 wherein said mantle layer has a thickness in the range of from about 0.020 to about 0.150 inches.

40. The multi-layer golf ball of claim 39 wherein said mantle layer has a thickness in the range of from about 0.030 to about 0.060 inches.

41. The multi-layer golf ball of claim 38 wherein each of said inner cover layer, said outer cover layer, and said mantle layer has a thickness in the range of from about 0.02 to about 0.1 inches.

42. The multi-layer golf ball of claim 41 wherein each of said inner cover layer, said outer cover layer, and said mantle layer has a thickness in the range of from about 0.3 to about 0.07 inches.

43. The multi-layer golf ball of claim 41 wherein said outer cover layer exhibits a Shore D hardness of less than 47.

44. The multi-layer golf ball of claim 38 wherein said mantle layer comprises a particulate filler material dispersed throughout said mantle layer.

45. The multi-layer golf ball of claim 31, said non-rubber material in said core selected from the group consisting of steel, tungsten, bismuth, stainless steel, and combinations thereof.

* * * * *